Patented Feb. 22, 1938 2,109,326

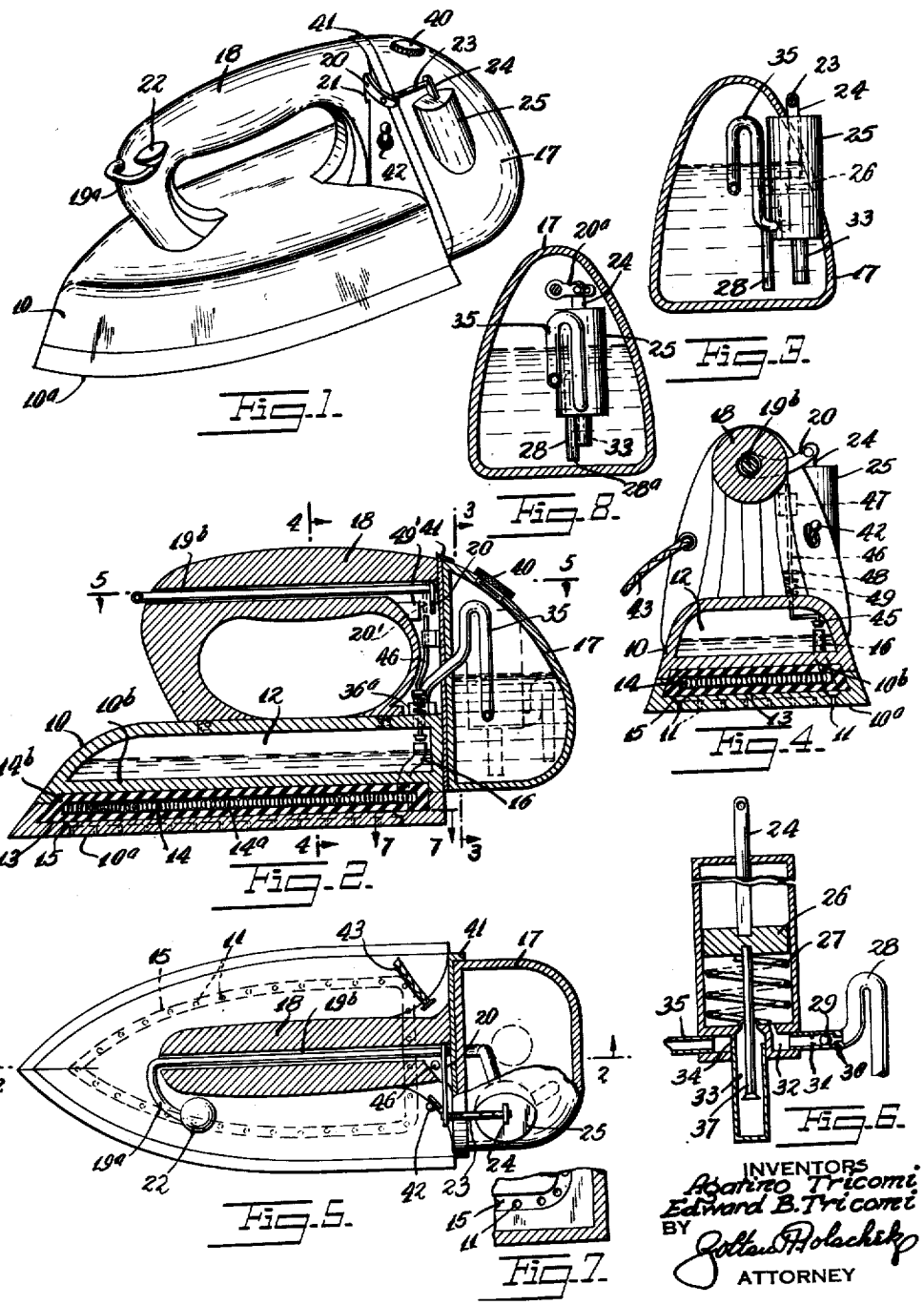

UNITED STATES PATENT OFFICE 2,109,326

STEAM-ELECTRIC PRESSING IRON

Agatino Tricomi and Edward B. Tricomi, Brooklyn, N. Y.

Application April 27, 1936, Serial No. 76,566

1 Claim. (Cl. 38—77)

This invention relates to new and useful improvements in a steam electric pressing iron.

The invention has for an object the construction of an iron as mentioned which is characterized by a hollow metallic body with a flat bottom having a plurality of perforations connecting with said hollow, and associated with a water container and pump, and an electric heater by which water may be supplied from the water container into said hollow and transformed into steam which discharges through said perforations.

A further object of the invention is to provide the pressing iron with a handle through which a stem passes, which stem has an outturned end adapted to be used as a lever by which the pump may be actuated with the thumb.

A further object of the invention is to arrange the pump upon the side or within the container.

Still further the invention contemplates mounting the water container jointly on the metallic body and on the handle of the device.

A further object of the invention resides in the provision of an arrangement whereby the water which is pumped into the hollow of the metallic body may be confined therein so that a satisfactory steam pressure may be built up before it is discharged through the perforations.

Another object is the construction of an article as mentioned which is simple and durable and which may be manufactured and sold at a reasonable cost.

For further comprehension of the invention and of the objects and advantages thereof, reference will be had to the following description and accompanying drawing, and to the appended claim in which the various novel features of the invention are more particularly set forth.

In the accompanying drawing forming a material part of this disclosure:—

Fig. 1 is a perspective view of a steam electric iron constructed according to this invention.

Fig. 2 is a longitudinal sectional view of Fig. 1.

Fig. 3 is a transverse sectional view taken on the line 3—3 of Fig. 2.

Fig. 4 is a transverse sectional view taken on the line 4—4 of Fig. 2.

Fig. 5 is a horizontal sectional view taken on the line 5—5 of Fig. 2.

Fig. 6 is a fragmentary sectional view of the pump per se.

Fig. 7 is a fragmentary horizontal sectional view taken on the line 7—7 of Fig. 2.

Fig. 8 is a sectional view similar to Fig. 3 but showing a modified arrangement.

The steam electric pressing iron, according to this invention, comprises a hollow metallic body 10 formed with a flat bottom 10$^a$ having a plurality of perforations 11 connecting with the hollow. More specifically, the hollow of the body 10 is divided into two distinct compartments, separated by a partition 10$^b$. There is a compartment 12 above the partition which is utilized to receive water from a pump as herein after further described, and a lower compartment 13 in which an electric heater 14 is disposed. This electric heater comprises an electric heating element 14$^a$ within insulation and heat retaining material 14$^b$. The perforations 11 connect with a channel 15 formed in a base of the compartment 13. A pipe 16 connects with the channel 15 and extends upwards into the compartment 12.

A water container 17 is mounted upon the pressing iron partially on the hollow body 10 at the back, and partially upon a handle 18 which is attached to the top of the body 10. A pump is mounted within the container 17 and is adapted to be manually operable by a lever 19$^a$ on the front top end of the handle 18.

More specifically, the lever 19$^a$ connects with a portion 19$^b$ extending longitudinally through the handle 18. At the inner end the stem portion 19$^b$ connects with a radial arm 20. This radial arm extends out from a side opening 21 in the handle 18. Lever 19$^a$ is provided with a head 22 adapted to receive one's thumb. The outer end of the arm 21 connects with a pin 23, in turn connected with the stem 24 of the pump.

The water pump comprises a cylinder 25 containing a piston 26. The stem 24 is connected with the top of the piston and extends from the top of the cylinder. The piston is normally urged upwards by an expansion spring 27 housed within the cylinder 25. The pump has a water inlet pipe 28 which has its bottom end 28$^a$ extending down to the bottom of the water container. This inlet pipe connects with a valve 29 adapted to act against a valve seat 30 and against a cage 31 on opposite sides thereof. From the valve, the liquid entering the inlet may pass through a passage 32, into the cylinder 25 and hence into a passage 33 which connects with another passage 34, in turn connected with the outlet pipe 35.

This outlet pipe extends through a wall of the container 17 and discharges into the compartment 12 at the point 36$^a$. An auxiliary member 37 is connected with the piston 26 and extends into the passage 33 to keep the piston 26 operating vertically and to act as a stop to prevent the spring 27 from becoming too tightly compressed. When the valve stem 24 is reciprocated, fluid will be pumped from the container 17 to the compartment 12. On each up stroke of the piston 26 fluid will be drawn through the inlet 28 and on each down stroke the valve 29 will close against the valve seat 30 so that the fluid is forced out through the outlet 35.

The container 17 is provided with a removable screw closure 40 through which liquid may be supplied thereto. A support bracket 41 is interposed between the container 17 and the body 10 and handle 18. This support bracket serves as a foundation for an electric switch 42 for controlling the electricity to the iron. The supply of current is obtained through the cable 43.

A valve 45 is located above the top end of the pipe 16 and is supported on a rod 46 which is slidably mounted in a bearing 47. This rod 46 is provided with a flange 48 against which an expansion spring 49 acts. This expansion spring also acts against the top of the body 10 and serves to normally urge the rod 46 into a raised position so that the valve 45 is opened. The upper end of the rod 46 is disposed immediately adjacent the arm 20. A block 49' is attached within the handle 18 and serves to limit flexing of the arm 20. The arm 20 may be flexed by forcing the lever 19ª to axially move the stem portion 19ᵇ, and then the arm 20 will assume the position indicated by the dot and dash lines 20' in Fig. 2.

While the lever 19ª is held in this position it may be simultaneously pressed downwards so that the arm 20 strikes the top of the rod 46 and moves the rod downwards. The valve 45 is thus brought into contact with the top of the pipe 16 which is formed into a valve seat. In this condition the passage between the compartment 12 and the channel 15 is closed. Consequently, water and steam within the compartment 12 will be given an opportunity to build up a pressure. Then when the lever 19ª is released the valve 45 will be opened by the spring 49 and the high pressure steam discharged through the channel 15 and the perforations 11.

In Fig. 8 a slightly modified form of the invention is disclosed wherein the cylinder 25 of the pump is disposed completely within the container 17. The radial arm 20ª is shorter so that it is located completely within the container 17. It is connected with the upper end of the stem 24. In other respects this form of the invention is identical to the previous form and corresponding parts may be identified by the same reference numerals. The pipes 28 and 35 are formed with curved portions to act as traps.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention what we claim as new and desire to secure by United States Letters Patent is:—

In combination with a steam pressing iron having a body, a heating element in said body, a chamber in said body in thermal conductivity with said heating element, a water reservoir supported by said iron, a pump for forcing water from said reservoir to said chamber whereby steam may be generated when said iron is heated, said chamber having an outlet pipe, passages connecting said outlet pipe to the bottom of the iron to allow steam to pass to the work, and a member for actuating said pump normally in one position but shiftable to another position, valve means for closing said outlet to build up steam pressure in said chamber, and a valve actuating element attached to said valve means and selectively engageable or not with said pump actuating member in its shifted position whereby said valve means or, said valve means and said pump, together, may be selectively actuated by a single operation.

AGATINO TRICOMI.
EDWARD B. TRICOMI.